United States Patent [19]

Huber

[11] Patent Number: 5,416,629
[45] Date of Patent: May 16, 1995

[54] INTENSITY MODULATED DIGITAL OPTICAL COMMUNICATIONS USING A FREQUENCY MODULATED SIGNAL LASER

[75] Inventor: David R. Huber, Warrington, Pa.

[73] Assignee: General Instrument Corporation, Hatboro, Pa.

[21] Appl. No.: 985,184

[22] Filed: Dec. 2, 1992

[51] Int. Cl.[6] .............................................. H04B 10/00
[52] U.S. Cl. .................................... 359/182; 359/114; 359/130; 359/185; 359/188
[58] Field of Search ................................ 359/127–131, 359/114, 173, 185, 186, 188, 182

[56] References Cited

U.S. PATENT DOCUMENTS

| | | | |
|---|---|---|---|
| 4,813,756 | 3/1989 | Frenkel | 359/127 |
| 4,860,294 | 8/1989 | Winzer | 372/7 |
| 4,953,939 | 9/1990 | Epworth | 359/173 |
| 5,048,909 | 9/1991 | Henry | 385/27 |
| 5,105,295 | 4/1992 | O'Byrne | 359/191 |

OTHER PUBLICATIONS

E. G. Bryant, et al., "Two-Way Transmission at 2.488 Gbit/s Over a 132 km Operational Submerged Cable Using Erbium-Doped Fibre Power Amplifiers," *Electronics Letters*, vol. 26, No. 17, Aug. 16, 1990, pp. 1355–1357.

E. G. Bryant, et al., "Unrepeatered 2.4 Gbit/s Transmission Experiment Over 250 km of Step-Index Fibre Using Erbium Power Amplifier," *Electronics Letters*, vol. 26, No. 8, Apr. 12, 1990, pp. 528–530.

K. O. Hill, "Fiber-Based Passive Components," OFC '92 Conference, San Jose, Calif., Feb. 4–7, 1992.

*Primary Examiner*—Leslie Pascal
*Attorney, Agent, or Firm*—Barry R. Lipsitz

[57] ABSTRACT

In long distance digital and frequency modulation systems that use optical sources having optical frequency chirp, degradation due to optical dispersion in the transmission fiber is overcome by filtering the laser wavelength representative of one of the binary levels (e.g., binary "0"). An optical source such as a DFB laser is directly frequency modulated by a digital data stream. A first digital level is represented by a first intensity of the modulated carrier corresponding to a carrier wavelength $\lambda_1$ and a second digital level is represented by a second intensity of the modulated carrier corresponding to a carrier wavelength $\lambda_2$. A wavelength selective reflector is used to filter the wavelength $\lambda_1$ from the modulated carrier. The modulated carrier, from which wavelength $\lambda_1$ has been filtered, is then coupled to an optical communication path for transmission. In one embodiment the wavelength selective reflector is coupled to the laser output using an optical circulator. In another embodiment, a directional coupler is used.

14 Claims, 2 Drawing Sheets

INTENSITY MODULATED DIGITAL OPTICAL COMMUNICATIONS USING A FREQUENCY MODULATED SIGNAL LASER

BACKGROUND OF THE INVENTION

The present invention relates to optical fiber communication systems and more particularly to the communication of digital signals over long distances using optical sources that have optical frequency chirp.

The communication of signals over optical fibers has many advantages over electrical transmission using wires. Optical fibers currently in production can support virtually unlimited bandwidth with low attenuation. In optical communication systems, a light source, e.g., from a laser or light emitting diode (LED), is modulated by an information signal that is carried by the light via the optical fiber. The light source can be directly modulated or externally modulated by the information signal. The modulation of the carrier can comprise frequency modulation or amplitude modulation.

Various known optical sources, such as semiconductor lasers, exhibit optical frequency chirp when directly modulated by an information signal. Chirp is defined as a rapid change (as opposed to a long-term drift) of the emission wavelength of an optical source, and is often observed in pulsed operation of a source.

Long distance digital and frequency modulation systems that use optical sources having optical frequency chirp suffer degradation due to optical dispersion in the transmission fiber. In a digital system, dispersion causes the digital pulses to spread. As a result, the pulses can overlap and interfere with each other, limiting data transmission speed. Since the pulses stretch out a certain amount each kilometer of fiber, pulse dispersion increases linearly with the distance traveled. Dispersion is particularly troublesome in long distance transmission, where it causes a severe degradation in the system bit error rate.

A typical optical source for communicating signals over long distances is the direct feedback (DFB) laser diode. One technique that has been used to reduce the chirp of a directly modulated DFB laser diode is to use a lower modulation depth. This method, however, also leads to lower extinction ratio, which makes it more difficult to discriminate between the transmitted digital levels. More particularly, in the optical communication of digital signals, the light intensity is either "on" (e.g., a digital 1) or "off" (e.g., a digital 0). The extinction ratio is defined as the ratio of the intensity when the light source is "on" to the intensity when the light source is "off." Ideally, the extinction ratio would be infinity. However, this is impossible to achieve in a practical system, where an extinction ratio on the order of 20 dB is considered to be very good.

DFB lasers that have been proposed for use in communication systems where a receiver directly detects light intensity have both amplitude modulated (AM) and frequency modulated (FM) components. The presence of FM components degrades system performance. More particularly, the greater the FM modulation index (i.e., the greater the difference between the wavelength associated with a digital 1 and the wavelength associated with a digital 0), the more dispersion will occur over the transmission fiber in the time domain. Thus, dispersion has been a serious problem in systems where it is desired to directly detect digital signals communicated over an optical communication path by a light source exhibiting optical frequency chirp.

It has been proposed to use an unbalanced Mach-Zehnder interferometer as an optical filter in such systems to pass only the higher intensity modulated light. This has been found to increase the extinction ratio. See, e.g., E. G. Bryant, et al., "Two-Way Transmission at 2.488 Gbit/s Over a 132 km Operational Submerged Cable Using Erbium-Doped Fibre Power Amplifiers," *Electronics Letters*, Vol. 26, No. 17, Aug. 1990, pp. 1355–1357 and e.g., Bryant, et al., "Unrepeatered 2.4 Gbit/s Transmission Experiment Over 250 km of Step-Index Fibre Using Erbium Power Amplifier," *Electronics Letters*, Vol 26, No. 8, April 1990, pp. 528–530. The use of an unbalanced Mach-Zehnder interferometer in the system described in the referenced publication adds expense to the system and it may be difficult to maintain the alignment of the Mach-Zehnder optical filter with the optical frequency of the laser.

It would be advantageous to provide an alternative method for increasing the extinction ratio in a long distance digital system that uses an optical source having optical frequency chirp. Such a scheme should enjoy relatively low cost and be easy to implement. The present invention provides apparatus for use in transmitting digital data over an optical communication path enjoying the aforementioned advantages.

SUMMARY OF THE INVENTION

In accordance with the present invention, apparatus is provided for use in transmitting digital data over an optical communication path. An optical source is provided for generating an optical carrier that is frequency modulated by a digital data stream. A first digital level, such as a binary "0", is represented by a first intensity of the modulated carrier corresponding to a carrier wavelength $\lambda_1$. A second digital level, such as a binary "1" is represented by a second intensity of the modulated carrier corresponding to a carrier wavelength $\lambda_2$. Wavelength selective reflector means are coupled to an output of the optical source for filtering the wavelength $\lambda_1$ from the modulated carrier. The modulated carrier, without the wavelength $\lambda_1$, is coupled to the optical communication path.

In a first illustrated embodiment, the modulated carrier from which the wavelength $\lambda_1$ has been filtered is coupled to the-optical communication path by coupling means comprising an optical circulator. The optical circulator has a first port for receiving the modulated carrier from the optical source. A second port of the optical circulator is coupled to the wavelength selective reflector means for reflecting the wavelength $\lambda_2$ back into the second port while passing the wavelength $\lambda_1$. A third port is coupled to the optical communication path. The modulated carrier circulates from the first port to the second port before reaching the third port. The wavelength selective reflector can comprise a grating.

In a second illustrated embodiment, the wavelength selective reflector means are coupled in series with the optical source and pass the wavelength $\lambda_2$ to the optical communication path while reflecting the wavelength $\lambda_1$ back to the optical source. Again, the wavelength selective reflector means can comprise an optical grating.

In a third illustrated embodiment, the coupling means comprise a directional coupler. The directional coupler has an input coupled to receive the modulated carrier. A first output is coupled to the wavelength selective reflector means for reflecting the wavelength $\lambda_2$ of the modulated carrier exiting the first output back into the directional coupler, while passing the wavelength $\lambda_1$ out of the directional coupler. A second output outputs the reflected wavelength $\lambda_2$ from the directional coupler. As in the other embodiments, the wavelength selective reflector means can comprise an optical grating.

DETAILED DESCRIPTION OF THE INVENTION

Long distance digital and frequency modulation systems that use optical sources having optical frequency chirp suffer degradation due to optical dispersion in the transmission fiber. A typical optical source with undesired chirp is a DFB laser diode. It is undesirable to reduce the chirp by lowering the modulation depth of a directly modulated DFB laser because in such a method, lower extinction ratio results.

In direct detection intensity schemes, the laser chirp is an unwanted by-product. As noted above, it has been suggested to overcome the problem of dispersion in a long distance digital system that uses a direct intensity modulated DFB laser by providing an unbalanced Mach-Zehnder interferometer that acts as an optical filter.

The present invention provides alternative methods for filtering a modulated carrier from a laser exhibiting chirp, such as a directly modulated DFB laser. Each of the embodiments of the present invention utilizes a wavelength selective reflector, such as an optical grating, to select a desired optical wavelength representing a first binary level while rejecting a second optical wavelength representing another binary level.

Figure 1:
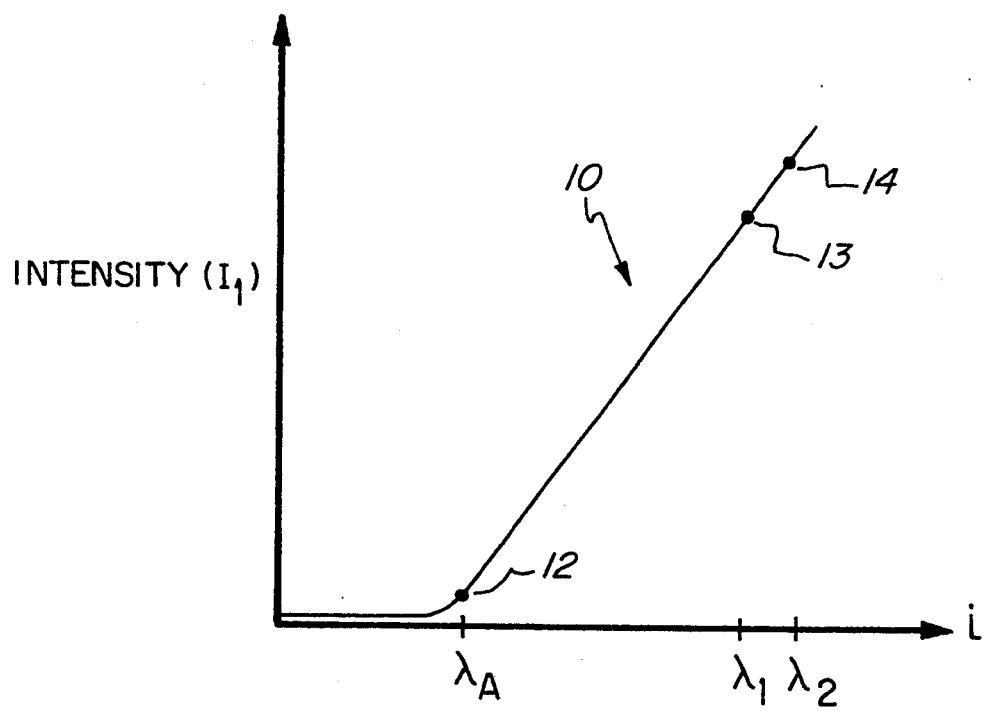
FIG. 1 is a plot showing intensity versus injection current for a laser diode, indicating frequency chirp.

FIG. 1 shows a plot 10 representing the effects of optical chirp where injection current (i) is plotted against the intensity (I) output from the laser diode. At a first intensity 12, the laser diode operates at a wavelength $\lambda_4$. At a second intensity 14, the laser operates at wavelength $\lambda_2$. As desired, intensity increases as the injection current goes up. However, the operating wavelength is different for different intensity levels. In prior art systems, where $\lambda_4$ and $\lambda_2$ are far apart as shown, this causes degradation in transmission due to the optical dispersion in the transmission fiber.

In accordance with the present invention, a new operating point 13 is selected. At this operating point, the wavelength is $\lambda_1$ which is close to $\lambda_2$. By using the intensity at wavelength $\lambda_2$ to represent a binary one and the intensity at wavelength $\lambda_1$ to represent a binary zero, degradation due to dispersion is substantially overcome since the difference in frequency between a one and zero is minimal. Further, the wavelength $\lambda_1$ is filtered from the system, to reduce the intensity at this wavelength toward zero. This scheme advantageously increases the extinction ratio while reducing chirp.

Figure 2:
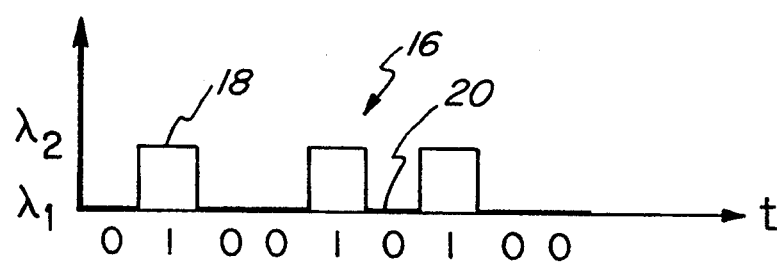
FIG. 2 is an illustration of a digital waveform over time.
Figure 3:
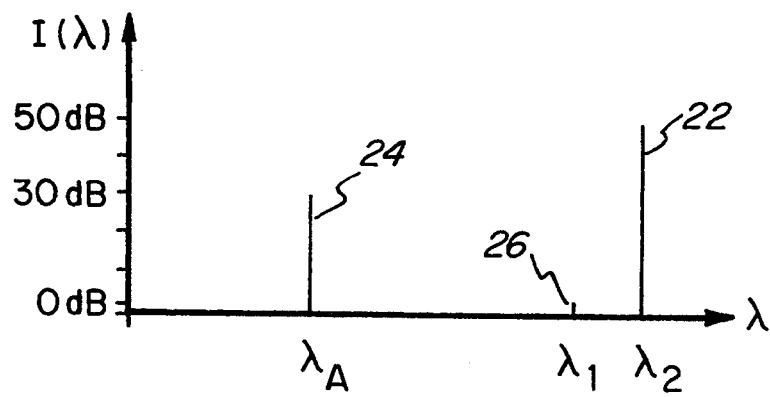
FIG. 3 is a plot illustrating the operation of a laser at three distinct wavelengths.

As indicated in FIG. 2, digital waveform 16 has a first level 18 representing a binary "1" and a second level 20 representing a binary "0". At level 18 (binary "1") the laser operates at wavelength $\lambda_2$. At level 20 (binary "0") the laser operates at wavelength $\lambda_1$. It is desirable to optimize the drive electronics for the laser and the laser diode design itself, using well known techniques, to provide a fast rise time between the two laser output levels. By doing this, the laser will spend most of its time operating either at wavelength $\lambda_1$ or wavelength $\lambda_2$, as illustrated by the frequency spectra 22, 26, respectively, in FIG. 3. The $\lambda_4$ operating point 24, which would result in greater chirp with a lower extinction ratio, is not used.

Figure 4:
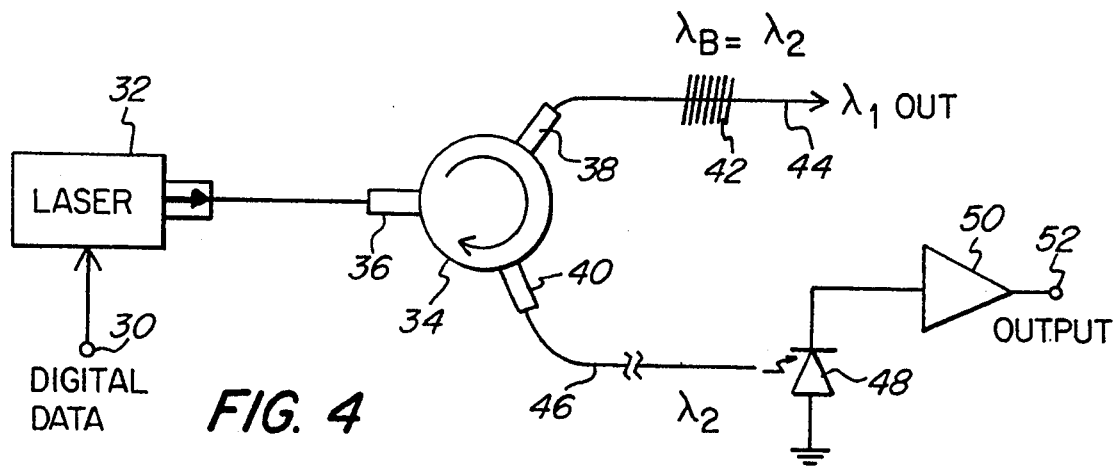
FIG. 4 is a schematic diagram of a first embodiment of the invention that uses an optical circulator for coupling to a wavelength selective reflector.

FIG. 4 illustrates a first embodiment of the present invention, in which a wavelength selective reflector 42 is coupled to the laser output via an optical circulator 34. Laser 32, which can be a DFB laser, is directly modulated by digital data input to terminal 30. The modulated light output from the laser is input to circulator 34 via a first input port 36. The light will travel from input port 36 to circulator port 38 where it is output toward reflector 42. The Bragg wavelength $\lambda_B$ of reflector 42 is equal to the wavelength $\lambda_2$ at which the laser outputs an intensity level 18 (FIG. 2) corresponding to a binary "1". Thus, this wavelength will reflect back to port 38 of circulator 34 where it continues on to output port 40. At the same time, the light at wavelength $\lambda_1$ representing intensity level 20 (FIG. 2) and which corresponds to a binary "0" is lost from reflector 42 via optical fiber 44.

The light at wavelength $\lambda_2$ passes out of output port 40 via optical fiber 46 for long distance transmission to a receiver represented schematically by photodetector 48. The received signal is converted by the photodetector into the electrical domain, for amplification by a conventional electrical amplifier 50 and output via output terminal 52 to a data receiver.

In a preferred embodiment, the wavelength selective reflector 42 comprises a reflection Bragg grating. Such gratings can be formed using techniques disclosed, for example, in G. Meltz, et al., "Formation of Bragg Gratings in Optical Fibers by a Transverse Holographic Method," *Optics Letters*, Vol. 14, No. 15, pp. 823–825, August 1989 and R. Kashyap, et al , "All-Fibre Narrow Band Reflection Gratings at 1500 nm," *Electronics Letters*, Vol 26, No. 11, pp. 730–732, May 1990. The Bragg grating reflector could be replaced with a Bragg grating resonator to achieve the same result. In this case, the resonator would be tuned to reflect one wavelength and pass the other, depending on the specific implementation.

Figure 5:
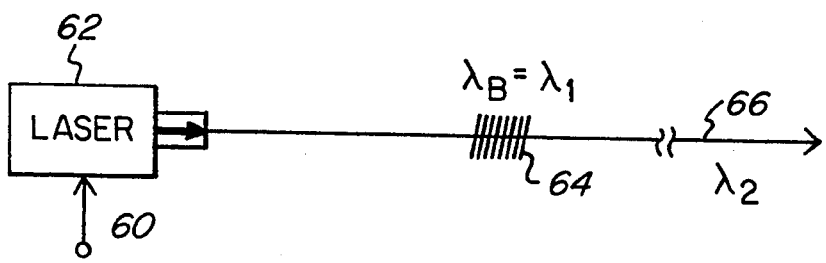
FIG. 5 is a schematic diagram of a second embodiment of the invention illustrating a wavelength selective reflector in series with a laser.

FIG. 5 illustrates an alternate embodiment wherein a wavelength selective reflector 64 is coupled in series with the output of laser 62. Reflector 64 can comprise a grating as described above. Laser 62 is directly modulated by digital data input to terminal 60. In this embodiment, the Bragg wavelength of reflector 64 is set to equal wavelength $\lambda_1$ of the laser. Thus, wavelength $\lambda_1$ will be reflected back to the laser and only wavelength $\lambda_2$ will exit the reflector 64 to be carried on the transmission link fiber 66.

Figure 6:
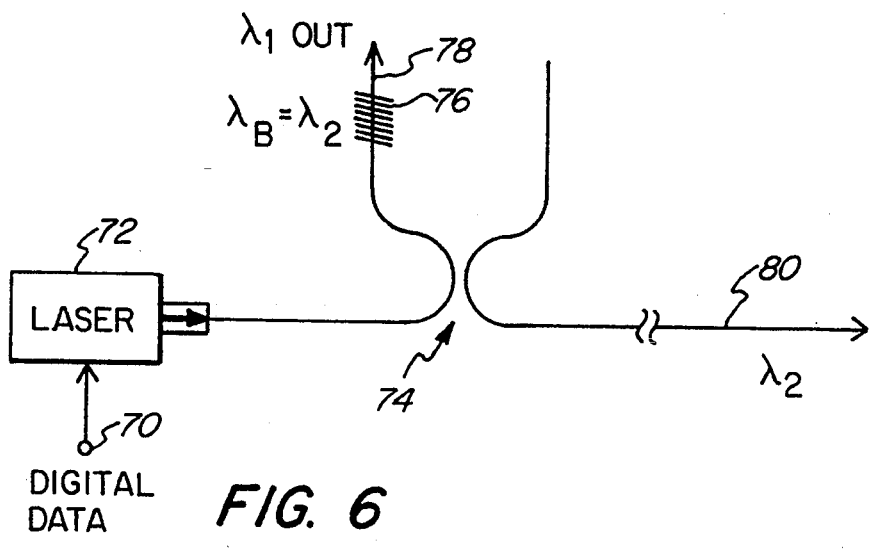
FIG. 6 is a schematic diagram of a third embodiment of the invention illustrating the use of a directional coupler for coupling a laser to a wavelength selective reflector.

In the embodiment of FIG. 6, a directional coupler generally designated 74 is used to couple the laser to a grating 76 serving as the wavelength selective reflector. In this embodiment, like the embodiment of FIG. 4, the Bragg wavelength of the grating equals the wavelength $\lambda_2$ of the laser. Thus, energy at wavelength $\lambda_1$ will be output from the directional coupler via output end 78, whereas the energy at wavelength $\lambda_2$ will be reflected back into the coupler for output to transmission link fiber 80. The laser 72 is directly modulated by digital data input at terminal 70.

It should now be appreciated that the present invention provides a scheme for overcoming the degradation due to optical dispersion in long distance digital systems that use optical sources having optical frequency chirp. In such systems, each of the digital levels will be provided at a different wavelength. By using a wavelength selective filter such as an optical grating, the wavelength representing a first binary level (e.g., binary "0") can be discarded, such that only the wavelength representing a second binary level (e.g., binary "1") is transmitted through the system. Since only a single wavelength is transmitted through the system, interference between the two wavelengths due to optical dispersion in the transmission fiber is avoided.

Although the invention has been described in connection with various specific embodiments, those skilled in the art will appreciate that various adaptations and modifications may be made thereto, without departing from the spirit and scope of the invention as set forth in the claims.

I claim:

1. Apparatus for use in transmitting an optical signal carrying digital data over an optical communication path, comprising:
   an optical source for generating an optical carrier that is frequency modulated by a digital data stream, wherein a first digital level is represented by a first intensity of the modulated carrier corresponding to a carrier wavelength $\lambda_1$ and a second digital level is represented by a second intensity of the modulated carrier corresponding to a carrier wavelength $\lambda_2$, the wavelengths $\lambda_1$ and $\lambda_2$ being close enough together to effectively reduce the degradation of said optical signal due to optical dispersion along said path;
   wavelength selective reflector means coupled to an output of said optical source, for filtering said wavelength $\lambda_1$ from said modulated carrier to increase the extinction ratio of said first and second digital levels in the modulated carrier prior to the communication thereof via said optical communication path; and
   means for coupling said modulated carrier with the wavelength $\lambda_1$ filtered therefrom to said optical communication path for communication to a receiver.

2. Apparatus in accordance with claim 1 wherein said first digital level represents a zero and said second digital level represents a one.

3. Apparatus in accordance with claim 1 wherein said coupling means comprise an optical circulator having:
   a first port for receiving said modulated carrier from said optical source;
   a second port coupled to said wavelength selective reflector means for reflecting said wavelength $\lambda_2$ back into said second port while passing said wavelength $\lambda_1$; and
   a third port coupled to said optical communication path;
   wherein said modulated carrier circulates from said first port to said second port before reaching said third port.

4. Apparatus in accordance with claim 3 wherein said wavelength selective reflector means comprise a grating.

5. Apparatus in accordance with claim 4 wherein said grating is formed in an optical fiber coupled to said second port.

6. Apparatus in accordance with claim 3 wherein said first digital level represents a zero and said second digital level represents a one.

7. Apparatus in accordance with claim 1 wherein said wavelength selective reflector means are coupled in series with said optical source and pass said wavelength $\lambda_2$ to said optical communication path while reflecting said wavelength $\lambda_1$ back toward said optical source.

8. Apparatus in accordance with claim 7 wherein said wavelength selective reflector means comprise an optical grating.

9. Apparatus in accordance with claim 8 wherein said grating is formed in an optical fiber coupled in series with said optical source.

10. Apparatus in accordance with claim 7 wherein said first digital level represents a zero and said second digital level represents a one.

11. Apparatus in accordance with claim 1 wherein said coupling means comprise a directional coupler having:
   an input coupled to receive said modulated carrier;
   a first output coupled to said wavelength selective reflector means for reflecting said wavelength $\lambda_2$ of said modulated carrier exiting said first output back into said directional coupler while passing said wavelength $\lambda_1$ out of said directional coupler; and
   a second output for outputting said reflected wavelength $\lambda_2$ from said directional coupler.

12. Apparatus in accordance with claim 11 wherein said wavelength selective reflector means comprise an optical grating.

13. Apparatus in accordance with claim 12 wherein said grating is formed in an optical fiber coupled to said first output.

14. Apparatus in accordance with claim 11 wherein said first digital level represents a zero and said second digital level represents a one.

* * * * *